United States Patent
Fesseler

(10) Patent No.: US 12,362,661 B2
(45) Date of Patent: Jul. 15, 2025

(54) THREE-PHASE BOOST CONVERTER WITH PFC

(71) Applicant: ACD Antriebstechnik GmbH, Achstetten (DE)

(72) Inventor: Aaron Fesseler, Achstetten (DE)

(73) Assignee: ACD Antriebstechnik GmbH, Achstetten (DE)

( * ) Notice: Subject to any disclaimer, the term of this patent is extended or adjusted under 35 U.S.C. 154(b) by 154 days.

(21) Appl. No.: 18/011,896

(22) PCT Filed: Jun. 28, 2021

(86) PCT No.: PCT/EP2021/067621
§ 371 (c)(1),
(2) Date: Dec. 21, 2022

(87) PCT Pub. No.: WO2021/260222
PCT Pub. Date: Dec. 30, 2021

(65) Prior Publication Data
US 2023/0246541 A1    Aug. 3, 2023

(30) Foreign Application Priority Data
Jun. 26, 2020    (DE) .................... 10 2020 116 889.6

(51) Int. Cl.
*H02M 3/158*    (2006.01)
*H02M 1/42*    (2007.01)
*H02M 7/06*    (2006.01)

(52) U.S. Cl.
CPC ......... *H02M 1/4216* (2013.01); *H02M 3/158* (2013.01); *H02M 7/06* (2013.01)

(58) Field of Classification Search
CPC .......... H02M 1/12; H02M 1/32; H02M 1/322; H02M 3/3155; H02M 3/158;
(Continued)

(56) References Cited

U.S. PATENT DOCUMENTS 5,654,882 A * 8/1997 Kanazawa .......... H02M 1/4216
                                                            363/37
5,784,269 A * 7/1998 Jacobs .................. H02M 3/158
                                                            363/89
(Continued)

FOREIGN PATENT DOCUMENTS

| AT | 512752 | 2/2018 |
|---|---|---|
| CN | 102130572 | 7/2011 |

(Continued)

OTHER PUBLICATIONS

International Search Report and the Written Opinion Dated Sep. 10, 2021 From the International Searching Authority Re. Application No. PCT/EP2021/067621. (10 Pages).

(Continued)

*Primary Examiner* — Jeffrey A Gblende

(57) ABSTRACT

A network circuit for providing an intermediate circuit direct voltage and a load-dependent intermediate circuit current at an output from a three-phase supply network is described. The network circuit includes a capacitor in a midpoint network, which serves as an adjustable voltage source for setting a voltage difference across inductors at the input.

17 Claims, 14 Drawing Sheets

(58) Field of Classification Search
CPC ......... H02M 3/33507; H02M 3/33546; H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 1/08; H02M 7/1552; H02M 7/1623; H02M 1/4225; H02M 3/33592; H02M 3/073; H02M 3/10; H02M 3/135; H02M 3/137; H02M 7/10; H02M 7/00; H02M 7/06; H02M 7/064; H02M 7/068; H02M 3/156; H02M 7/5387; H02M 1/083; H02M 1/14; H02M 1/4216; G05F 1/30; G05F 1/33; G05F 1/32; G05F 1/34; G05F 1/38; G05F 1/52; H02J 7/12
See application file for complete search history.

(56) References Cited

U.S. PATENT DOCUMENTS

| | | | |
|---|---|---|---|
| 5,886,891 | A | 3/1999 | Jiang et al. |
| 5,933,336 | A * | 8/1999 | Jiang .................. H02M 1/4216 363/44 |
| 8,395,913 | B2 * | 3/2013 | Torrico-Bascope ........................ H02M 1/4216 363/47 |
| 8,466,652 | B2 * | 6/2013 | Klaes ...................... B60L 53/14 320/107 |
| 2004/0160789 | A1 | 8/2004 | Ying et al. |
| 2013/0194838 | A1 | 8/2013 | Jang et al. |
| 2015/0029771 | A1 * | 1/2015 | Hartmann ............... H02M 7/06 363/126 |

FOREIGN PATENT DOCUMENTS

| | | |
|---|---|---|
| EP | 0973245 | 1/2000 |
| GB | 2296139 | 6/1996 |
| JP | 08-196077 | 7/1996 |
| JP | 11-168885 | 6/1999 |
| JP | 2003-284343 | 10/2003 |
| JP | 2006-121890 | 5/2006 |
| JP | 2013-158239 | 8/2013 |
| WO | WO 93/12576 | 6/1993 |
| WO | WO 2005/006531 | 1/2005 |

OTHER PUBLICATIONS

Recherchebericht [Search Report] Dated Feb. 26, 2021 From the Deutsches Patent- und Markenamt [German Patent and Trademark Office] Re. Application No. 102020116889.6. (7 Pages).

Notice of Reasons for Rejection Dated Apr. 15, 2025 From the Japan Patent Office Re. Application No. 2022-580461 and Its Translation Into English. (11 Pages).

* cited by examiner

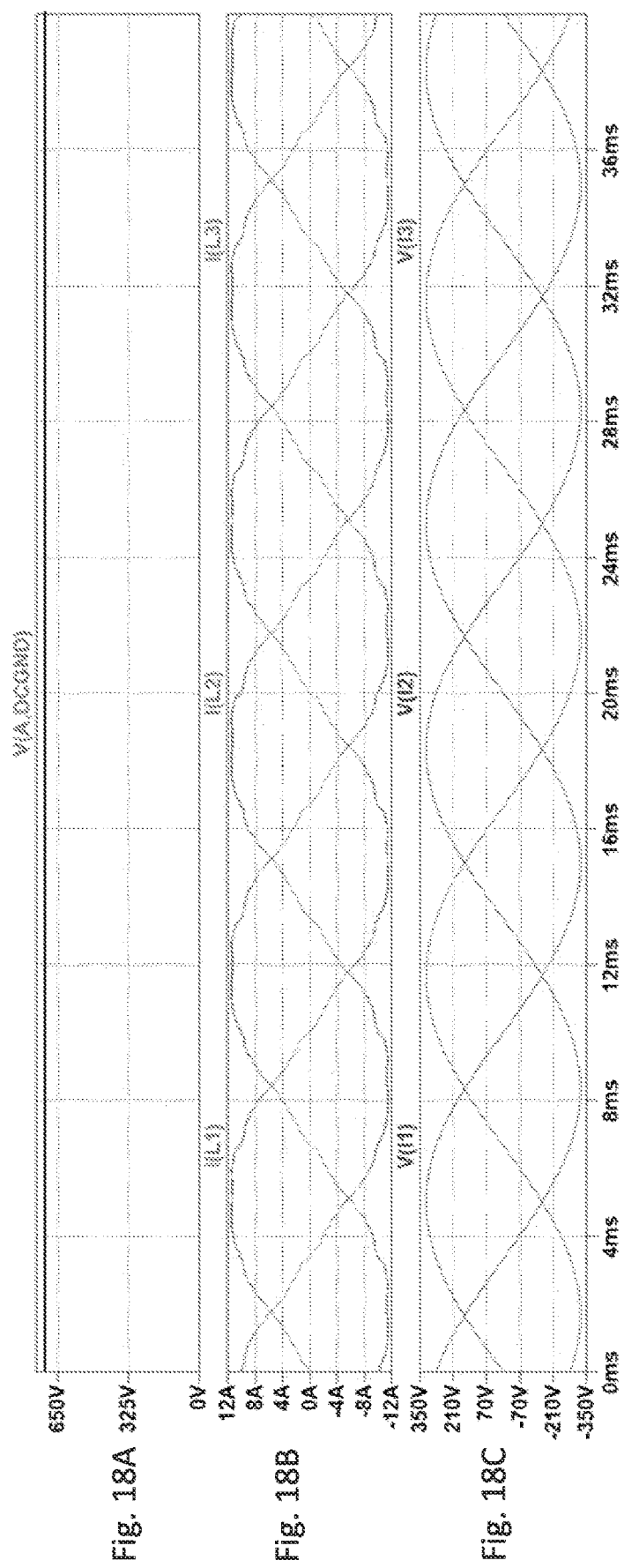

THREE-PHASE BOOST CONVERTER WITH PFC

RELATED APPLICATIONS

This application is a National Phase of PCT Patent Application No. PCT/EP2021/067621 having International filing date of Jun. 28, 2021, which claims the benefit of priority of Germany Patent Application No. 10 2020 116 889.6 filed on Jun. 26, 2020. The contents of the above applications are all incorporated by reference as if fully set forth herein in their entirety.

FIELD AND BACKGROUND OF THE INVENTION

The present invention relates to a network circuit for supplying electrical loads with direct current from a three-phase supply network, and to a method for modulating the string voltages from a three-phase supply network. The network circuit thereby ensures, independent of load, that phase currents at the input of a rectifier are substantially sinusoidal.

Network circuits are known from the prior art. EP 3 068 024 A1 discloses a three-phase pulse rectifier system with comparatively low reverse voltage stress on the power semiconductors that can be switched off and high power density, as well as low network feedback. Such a three-phase three-point pulse rectifier, also referred to as a so-called Vienna-rectifier, is known to be characterized by a substantially lower harmonic content on the AC side, in contrast to conventional six-pulse bridge circuits (B6) used for rectifying three-phase current.

The Vienna-rectifier is a circuit which requires a large number of components, making it very expensive, and also requires very complex control.

From the Austrian patent document AT 512 752 B1 a rectifier circuit with a three-phase rectifier arrangement of semiconductor valves, preferably a bridge rectifier circuit of diodes, is known, wherein the rectifier arrangement has a three-phase network-side input and a DC-side output, and at least one of three phases at the network-side input is connected to a first pole terminal of a three-phase circuit for discharging an injection current into the three-phase circuit.

U.S. document US 2013/0194838 A1 discloses a three-phase boost rectifier with low input current and harmonics, comprising an input stage for receiving a three-phase input voltage with respect to a neutral point and an output stage suitable for coupling to at least one load.

U.S. document U.S. Pat. No. 5,933,336 A discloses a boost converter comprising first, second and third phase inputs and an output. The boost converter further comprises a first switch and a second switch connected between respective leads of the output. The boost converter also includes first, second, and third capacitors that form first, second, and third L-C series paths with a first inductor, respectively. The first, second, and third L-C series paths are coupled between the first, second, and third phase inputs, respectively, and a node between the first and second switches. The first and second switches progressively cooperate to use a voltage across the leads minus a voltage across the first, second, and third capacitors to discharge currents through the first inductor, thereby reducing the total harmonic distortion (THD) of the input current at all three phase inputs.

European document EP 0 973 245 A2 discloses a circuit in which inductors are coupled to three phase inputs. Two switches are coupled between the output terminals. Three capacitors are connected in a star configuration to the three phase inputs, with the star point connected to the node between the switches. A rectifier with diodes is inserted between the inductors and the switches. The output is coupled to the switches through an output capacitor. The phase inputs are fed through an electromagnetic noise filter. The inductors operate in a discontinuous state. A control loop controls the switches. The switches operate together progressively, using the voltage across the outputs, which is less than that across the capacitors, to discharge the current through the inductors and reduce the total input current distortion at all phase inputs.

From international patent application WO 93/12 576 A1, circuitry is known to generate a current that is a harmonic of the frequency of a supply system and that has a selected amplitude and phase to reduce the total harmonic distortion of a system that converts AC to DC or vice versa. The DC signal is sampled and, through the control of switches, a sinusoidal current with the desired harmonic is generated and provided to an impedance network that injects this current into the multi-phase AC system of the electric power supplier. The impedance network includes a single inductor and a capacitor connected in series through each of the phases of the power supplier, with the current signal having an amplitude selected to substantially eliminate harmonics that cause high distortion of the supply signal.

Chinese document CN 102 130 572 A discloses a three-phase rectifier bridge DC side parallel connection type active power filter. The active power filter includes a coupling element on the AC side of a three-phase rectifier bridge, which is a low-frequency bidirectional power switch, and wherein the coupling element is an impedance. The active power filter improves upon the prior art in which two capacitors and four high-frequency power switching tubes, used in two boost-type bidirectional power converters, are mutually connected in series, in that only one capacitor and three high-frequency power switching tubes are required. Thus, compared to the prior art, the active power filter does not need to balance the voltage between the two original capacitors and thus exhibits better harmonic rejection.

It is also known that many loads connected to the public supply network draw pulsed line currents through simple bridge rectifiers, which are associated with large harmonic currents. These impulsive currents require the public supply network to be oversized. In addition, short-term voltage dips and voltage spikes occur, which increasingly cause problems for sensitive consumers. For this reason, there are corresponding standards that require the use of a so-called power-factor correction (PFC) above a certain power level. The use of active circuit solutions becomes necessary as a result, since the components in passive systems require a larger installation space and deliver currents with a shape that deviates from a sine wave.

The objective of the present invention is thus to provide a low-cost circuit with simple control that draws largely sinusoidal phase currents from a three-phase supply network, while maintaining limits on harmonic currents of PFC standards.

SUMMARY OF THE INVENTION

This objective is solved by a network circuit for providing an intermediate circuit direct voltage and a load-dependent intermediate circuit current at an output from a three-phase supply network. The network circuit ensures that the phase currents from the supply network are largely sinusoidal at the input of the rectifier. The network circuit thereby comprises an input, which is connected to the three-phase supply network via phases, and an output, which is connected to an intermediate circuit. The network circuit also includes a rectifier located between the input and the output. A network detection detects network parameters of the string voltages and current phases at the input and output parameters at the output. A control unit is connected to the network detection and controls a first switching transistor and a second switching transistor. A midpoint network is connected to the output and phases of the input via the first switching transistor and the second switching transistor, wherein the first switching transistor is connected to the control unit via a first control terminal and the second switching transistor is connected to the control unit via a second control terminal. The midpoint network includes a capacitor, wherein the capacitor is pre-charged via a clocked signal from the first switching transistor and thus serves as an adjustable voltage source for adjusting a voltage difference via one or more inductors.

Through this network circuit, the network currents from the public supply network are to be largely corrected to a sinusoidal shape and harmonics, which are generated for example due to pulse-like recharges of capacitors via rectifier diodes due to loads, are to be reduced.

According to a first aspect, the network circuit further comprises a coupling circuit connected between the phases at the input and the midpoint network. The coupling circuit, as part of the network circuit, is adapted to draw sinusoidal-like phase currents from all phases.

In one aspect, the supply network may also include a neutral conductor.

According to another aspect, the capacitor of the midpoint network is in series between the phases at the input and the connection point of the first switching transistor and the second switching transistor.

According to a further aspect, the midpoint network further comprises an inductor connected in series between the phases at the input and the first switching transistor and the second switching transistor.

According to another aspect, the midpoint network comprises a series-connected capacitor having a first inductor with a diode and a second inductor with a diode arranged between the phases at the input and the first switching transistor and the second switching transistor.

The above objective is further solved by a method for modulating the phase voltages and current from a three-phase supply network to provide an intermediate circuit direct voltage and a load-dependent intermediate circuit current at an output with sinusoidal phase currents, the method comprising feeding a network circuit with phase currents from a three-phase supply network via phases, detecting network parameters of the phases by a network detection, rectifying the phase currents in the phases to generate a rectified current, wherein the rectified current is distributed into a first rectified current and a second rectified current depending on a clock state, supplying at least one output with the first rectified current, and passing the second rectified current through a first switching transistor and a second switching transistor, driving control inputs of the first switching transistor and the second switching transistor by the control unit to pass a portion of the rectified current as a clocked signal through a midpoint network to the phases pre-charging a capacitor of the midpoint network with the clocked signal, modulating the phase currents in the phases via the inductor or inductors with the forwarded clocked signal, providing the intermediate circuit direct voltage and the load-dependent intermediate circuit current at the output, and withdrawing sinusoidal currents from the supply network.

In one aspect, the modulating comprises a controllable voltage drop across the inductor through the pre-charged capacitor.

According to another aspect, modulating the phase currents in the phases with the forwarded clocked signal is performed via a coupling circuit.

According to a further aspect, detecting network parameters comprises detecting at least one of phasing or phase position, string voltages, and phase currents.

According to a further aspect, driving the control inputs of the first switching transistor and the second switching transistor controls or influences the magnitude of the forwarded clocked signal and the intermediate circuit voltage by means of a duty factor.

According to a further aspect, driving the control inputs of the first switching transistors and the second switching transistors by the control unit is performed in such a way that, in the case of positive driving, first the first switching transistor is/becomes low-impedance for a switch-on duration at a time t1 up to a time t3, the second switching transistor is/becomes low-impedance at a time t2 up to a time t4 for a switch-on duration, and during the time t2 up to the time t3 for a short-circuit duration the first and the second switching transistor are/become low-impedance.

According to a further aspect, driving the control inputs of the first and the second switching transistors by the control unit is performed such that during a negative drive, first the second switching transistor is/becomes low-impedance for a switch-on duration at a time t1 until a time t3, the first switching transistor is/becomes low-impedance at a time t2 up to a time t4 for a switch-on duration, and during the time t2 up to the time t3 for a short-circuit duration the first and the second switching transistor are/become low-impedance.

According to a further aspect, modulating the forwarded clocked signal occurs such that the sinusoidal phase currents at the input comply with limits for harmonic currents according to a PFC standard during operation.

According to a further aspect, driving the control inputs of the first switching transistor and the second switching transistor is clocked at a clock frequency higher than a network frequency.

BRIEF DESCRIPTION OF THE SEVERAL VIEWS OF THE DRAWINGS

The invention will now be explained in more detail with reference to drawings. It shows:

FIGS. 18A to 18C a simulation result of the network circuit according to FIG. 17.

DESCRIPTION OF SPECIFIC EMBODIMENTS OF THE INVENTION

Figure 1:
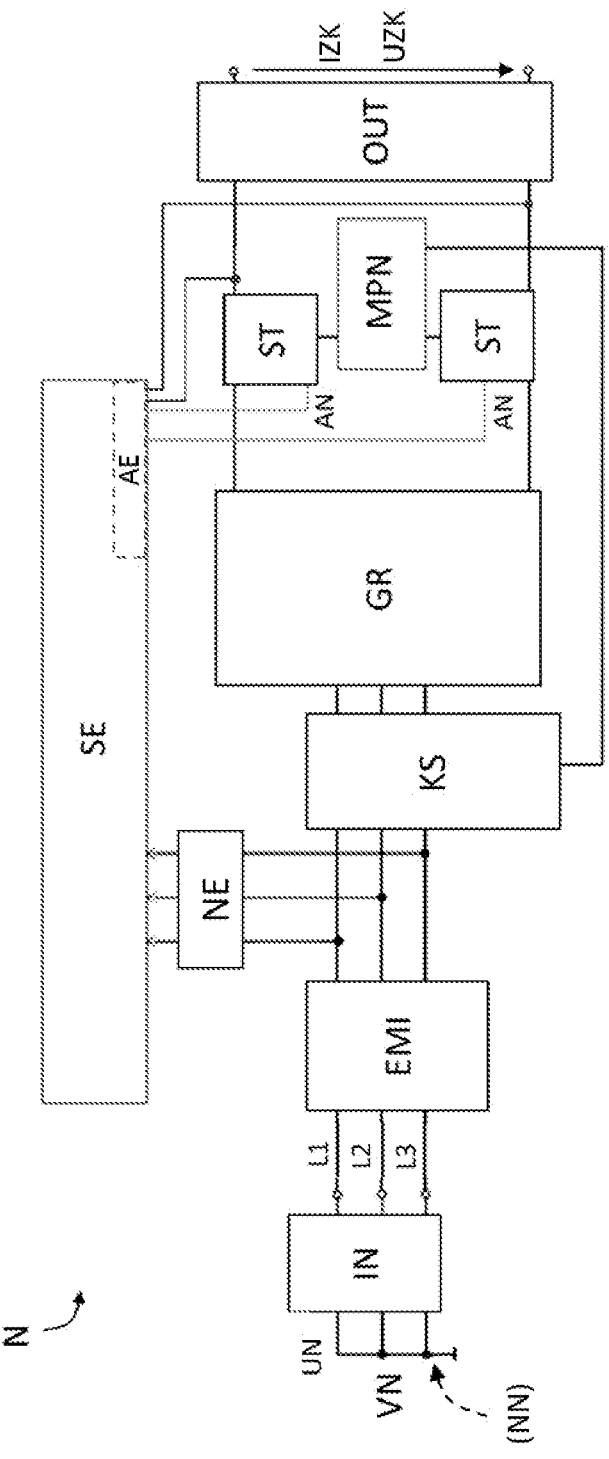
FIG. 1 a schematic diagram of a first embodiment of a network circuit.

With reference to FIG. 1, a general structure of a network circuit N according to a first embodiment for providing an intermediate circuit direct voltage UZK at an output OUT from a three-phase supply network VN is now described.

The network circuit N comprises a plurality of components which are interconnected. The network circuit N comprises an input IN, an EMI filter or electromagnetic interference filter, a network detection NE, a control unit SE optionally comprising an output detection AE, a rectifier GR, at least one control element ST, a midpoint network MPN, and an output OUT.

At the input IN, the network circuit N is connected to the supply network VN via phases L1, L2, L3. Phases L1, L2, L3 comprise network parameters NG. The network parameters NG comprise at least one of a phasing or phase position PL, string voltage UN (string voltages u1, u2, u3) and phase currents INL1, INL2, INL3.

EMI filter EMI is used to filter electromagnetic interference in a known manner. For this reason and for the sake of brevity, the EMI filter is not described in detail herein.

The respective network parameters NG of the phases L1, L2, L3 are detected by the network detection NE and passed on to the control unit SE.

In addition, the position of a symmetrical neutral point NN is indicated in FIG. 1, which occurs at the indicated position when the supply network VN is a four-wire three-phase system with a neutral wire.

The control unit SE may optionally be extended with the output detection AE to detect voltage magnitudes and current magnitudes at different positions, in particular at the output OUT of the network circuit N. Thus, the output detection detects at least one of an intermediate circuit voltage UZK and an intermediate circuit current IZK at the output OUT.

Figure 2:
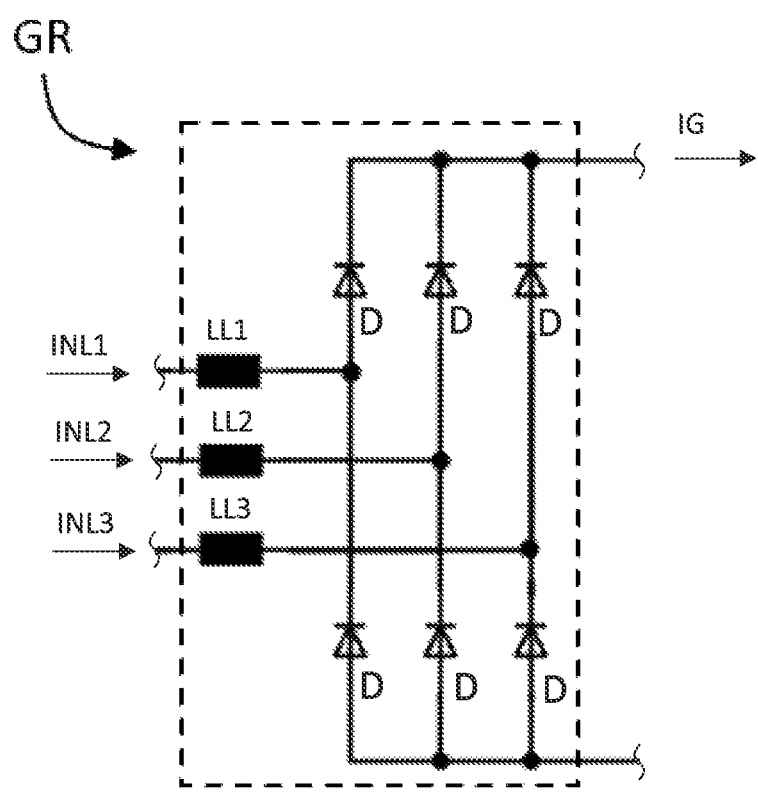
FIG. 2 an example of a rectifier.

As shown in FIG. 2, in one embodiment, the rectifier GR may be constructed with rectifier diodes D and with inductors LL1, LL2, LL3 as energy storage. However, the rectifier GR is not limited to this illustrated embodiment example. The rectifier GR may also be constructed with passive components, active components, and/or a combination thereof. Thus, the rectifier GR can be a rectifier and inverter which enables a regenerative capability into the supply network VN. The function of the rectifier GR corresponds to a known function and is therefore not described in detail for the sake of brevity.

The required energy in the intermediate circuit can be provided by known technologies for energy storage. Non-limiting examples of the technologies are known from the German patent application No. DE 10 2020 106 698.

Figure 3:
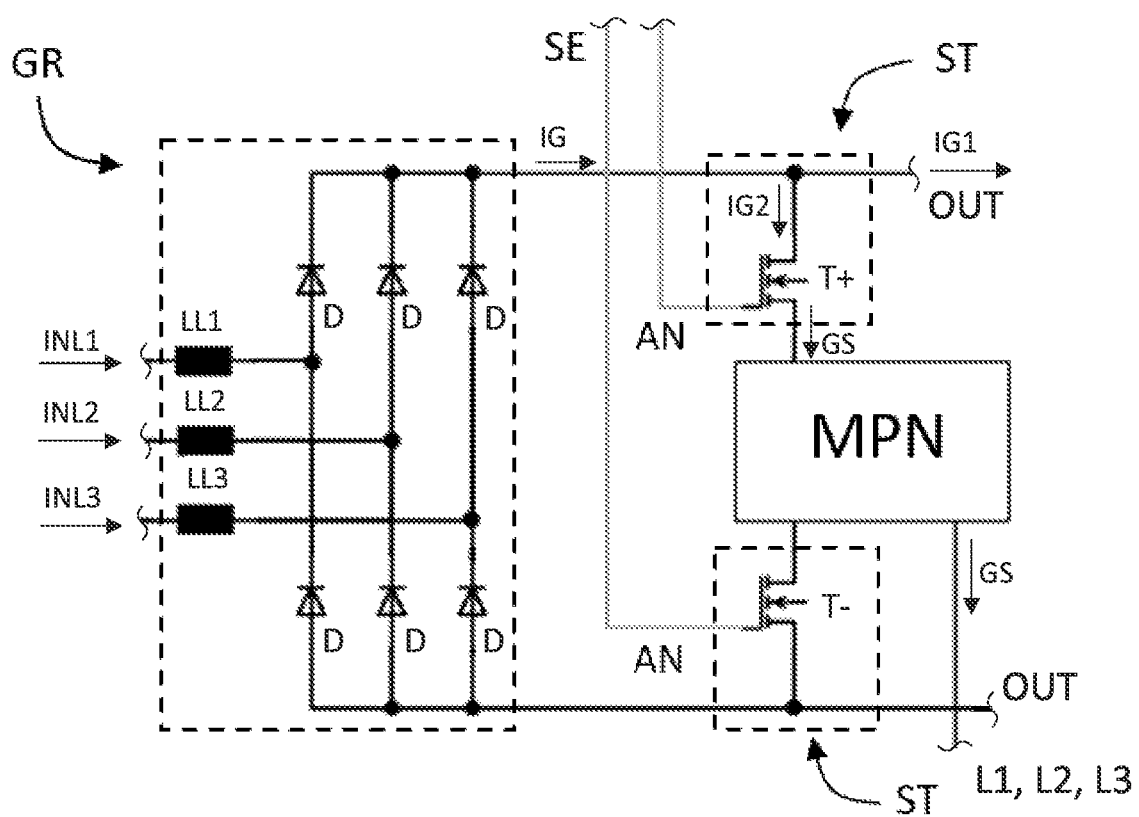
FIG. 3 a combination of the rectifier with a first example of control elements.

As illustrated in FIG. 3, the rectifier GR rectifies the phase currents INL1, INL2, INL3 in phases L1, L2, L3, thereby generating a rectified current IG. The rectified current IG is distributed, depending on a clock state of the at least one control element ST, into a first rectified current IG1 and a second rectified current IG2. The second rectified current IG2 is passed through the at least one control element ST. The first rectified current IG1 supplies the output OUT of the network circuit N.

The at least one control element ST comprises a first switching transistor T+ and a second switching transistor T− in the first embodiment of the network circuit N according to FIG. 1. The first switching transistor T+ comprises a control input AN. The second switching transistor T− comprises a control input AN. However, the at least one control element ST is not limited to the first and second switching transistors T+, T−.

It can be seen from FIG. 3 that a combination of the rectifier GR with the first and second switching transistors T+, T− of the network circuit N illustrates a boost converter. The boost converter is a form of a DC-converter. The magnitude of an output voltage at the output of the boost converter is always higher than the magnitude of an input voltage of the boost converter. The magnitude of an intermediate circuit voltage UZK at the output OUT is thus higher than the rectified value of a network voltage UN (see FIG. 9) at the input IN.

The control input AN of the at least one control element ST is driven by the control unit SE. In the network circuit N according to FIG. 1, the control inputs AN of the first switching transistor T+ and the second switching transistor T− are driven by the control unit SE. By driving the control inputs AN by the control unit SE, the second rectified current IG2 is converted into a clocked signal GS.

The clocked signal GS is forwarded by the at least one control element ST to the phases L1, L2, L3 via the midpoint network MPN, as can be seen from FIG. 1.

By forwarding the clocked signal GS to the phases L1, L2, L3, the phase currents INL1, INL2, INL3 and the rectified current IG in the phases L1, L2, L3 are modulated by the forwarded clocked signal GS. Due to the modulation, the phase currents INL1, INL2, INL3 become largely sinusoidal currents.

Figure 4:
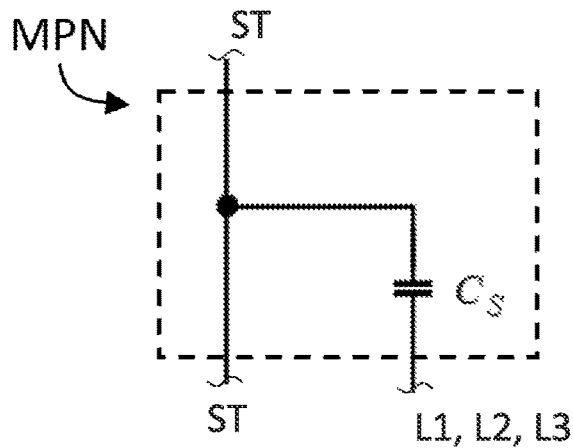
FIG. 4 a first example of a midpoint network.

FIG. 4 illustrates a first example of the midpoint network MPN. The midpoint network MPN according to the first example comprises a capacitor CS connected in series. The capacitor CS thus serves a voltage source and thus creates a voltage difference via the inductor(s) LL1, LL2, LL3.

Figure 5:
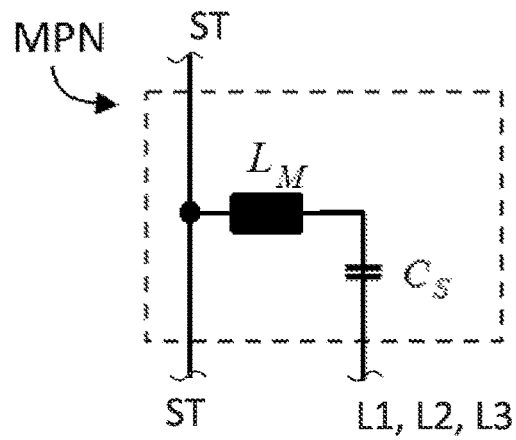
FIG. 5 a second example of the midpoint network.

FIG. 5 illustrates a second example of the midpoint network MPN. The midpoint network MPN according to the second example extends the midpoint network MPN according to the first example by an inductor LM connected in series. The midpoint network MPN according to the second example thus comprises the inductor LM and the capacitor CS, connected in series. FIG. 5 shows that a combination of the inductor LM and the capacitor CS according to the first example illustrates a series resonant circuit or an LC series resonant circuit.

Figure 6:
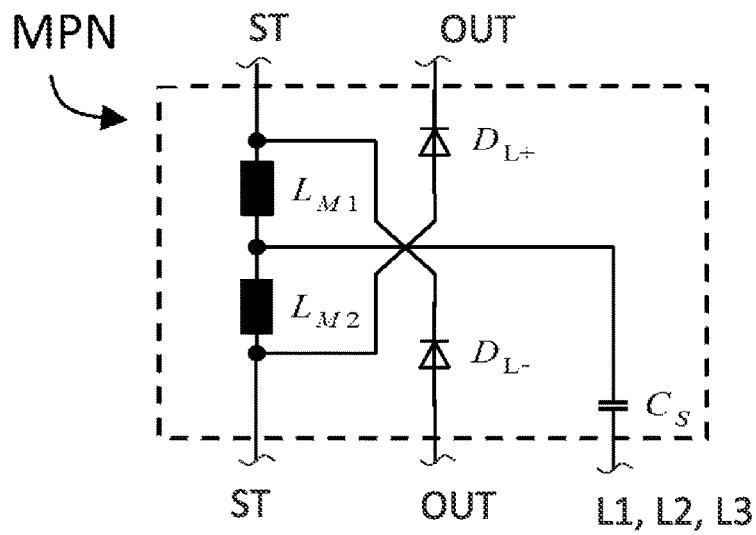
FIG. 6 a third example of the midpoint network.

FIG. 6 illustrates a third example of the midpoint network MPN. The midpoint network MPN according to the third example comprises the capacitor CS connected in series, a first inductor LM1 with diode DL+ and a second inductor LM2 with diode DL−. It can be seen from FIG. 6 that a combination of the inductor LM1, LM2 and the capacitor CS according to the third example illustrates another type of series resonant circuit or LC series resonant circuit as seen in FIG. 5.

The three examples shown in FIGS. 4 to 6 illustrate three different examples of realizing the midpoint network MPN, without intending to limit the midpoint network MPN to these three examples.

The network circuit N according to FIG. 1 further comprises a coupling circuit KS. The coupling circuit KS is adapted to extract sinusoidal-like phase currents from all phases L1, L2, L3. In other words, the coupling circuit KS ensures that higher frequency currents caused by the clocking of the at least one control element ST do not become visible in the phase currents INL1, INL2, INL3.

Figure 7:
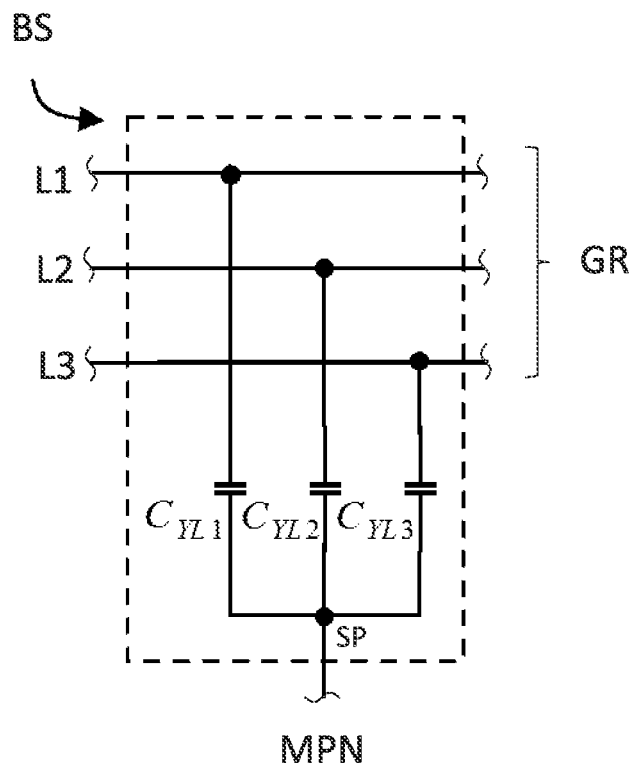
FIG. 7 a first example of a coupling circuit.

FIG. 7 illustrates a first example of the coupling circuit KS. The coupling circuit KS is a capacitor star circuit comprising capacitors CYL1, CYL2, CYL3 and a star point SP. The midpoint network MPN is connected to the star point SP of the capacitor star circuit in this example. The modulation of the phase currents INL1, INL2, INL3 is performed at the phases L1, L2, L3 with the forwarded clocked signal GS via the capacitor star circuit KS in this example. The forwarded clocked signal GS is therefore fed back to the star point of the coupling circuit KS.

Figure 8:
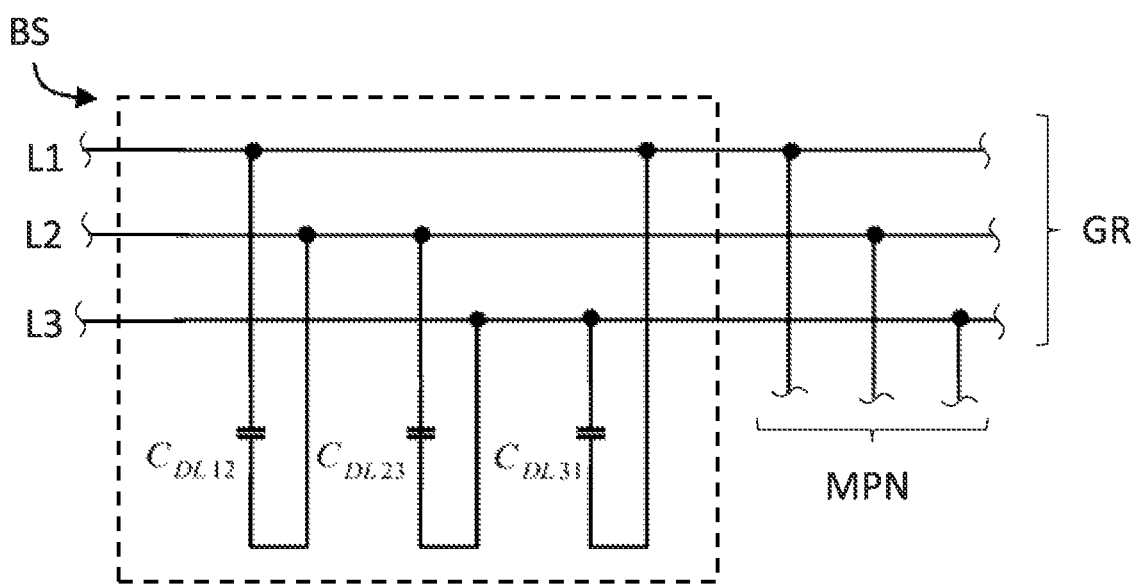
FIG. 8 a second example of the coupling circuit.

FIG. 8 illustrates a second example of the coupling circuit KS. The coupling circuit KS according to the second example is a capacitor delta circuit comprising capacitors CDL12, CDL23, CDL31. The midpoint network MPN is directly connected to the three phases L1, L2, L3 in this example. The forwarded clocked signal GS is therefore fed back directly to the phases L1, L2, L3.

Figure 9:
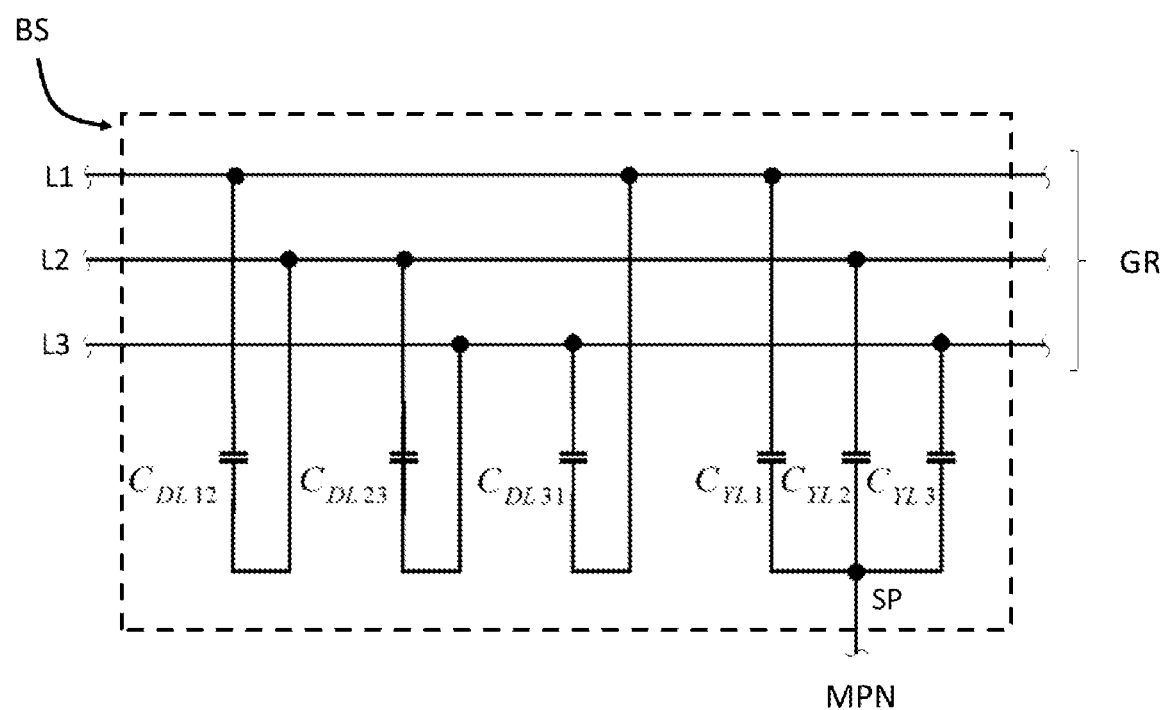
FIG. 9 a third example of the coupling circuit.

FIG. 9 illustrates a third example of the coupling circuit KS. The coupling circuit KS according to the third example is a combination of the coupling circuits according to the first and second examples.

The three examples shown illustrate three different examples for implementing the coupling circuit KS, without the intention of limiting the coupling circuit KS to these three examples.

Figure 10:
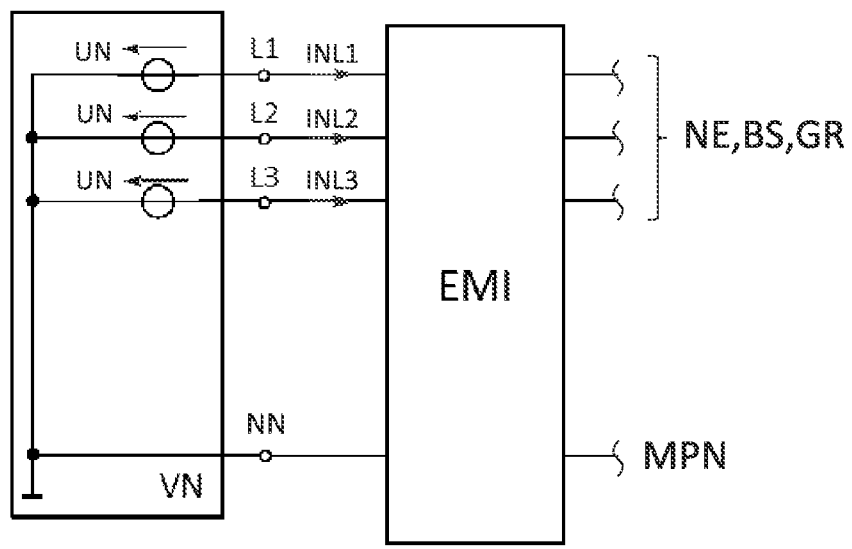
FIG. 10 a first example of a four-wire three-phase system.

Referring to FIG. 10, a portion of a first example of a network circuit N having a four-wire three-phase system with a neutral wire is illustrated. Unlike the three-wire three-phase system as previously described, the midpoint network MPN may also be directly connected to the symmetrical neutral point NN of the neutral wire.

Figure 11:
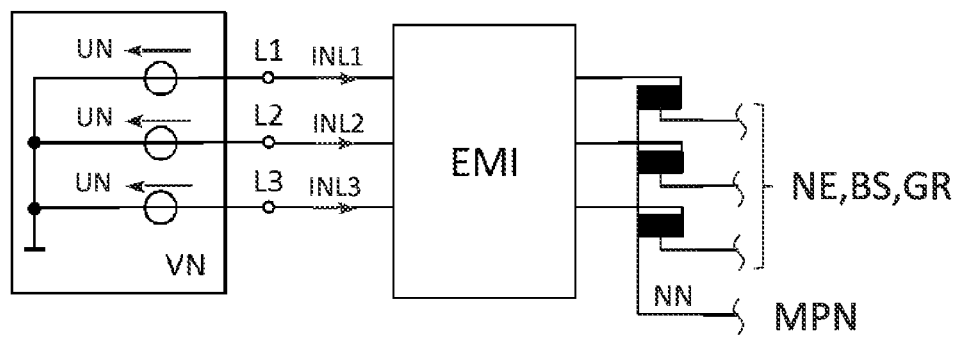
FIG. 11 a second example of a four-wire three-phase system.

Referring to FIG. 11, a portion of a second example of a network circuit N comprising a four-wire three-phase system with a neutral wire is illustrated. In this second example, the neutral wire may be made by at least one of autotransformers, isolation transformers, or another type of transformer upstream or downstream of the EMI filter EMI. In this example, the midpoint network MPN may also be directly connected to the symmetrical neutral point NN of the neutral wire.

Figure 12:
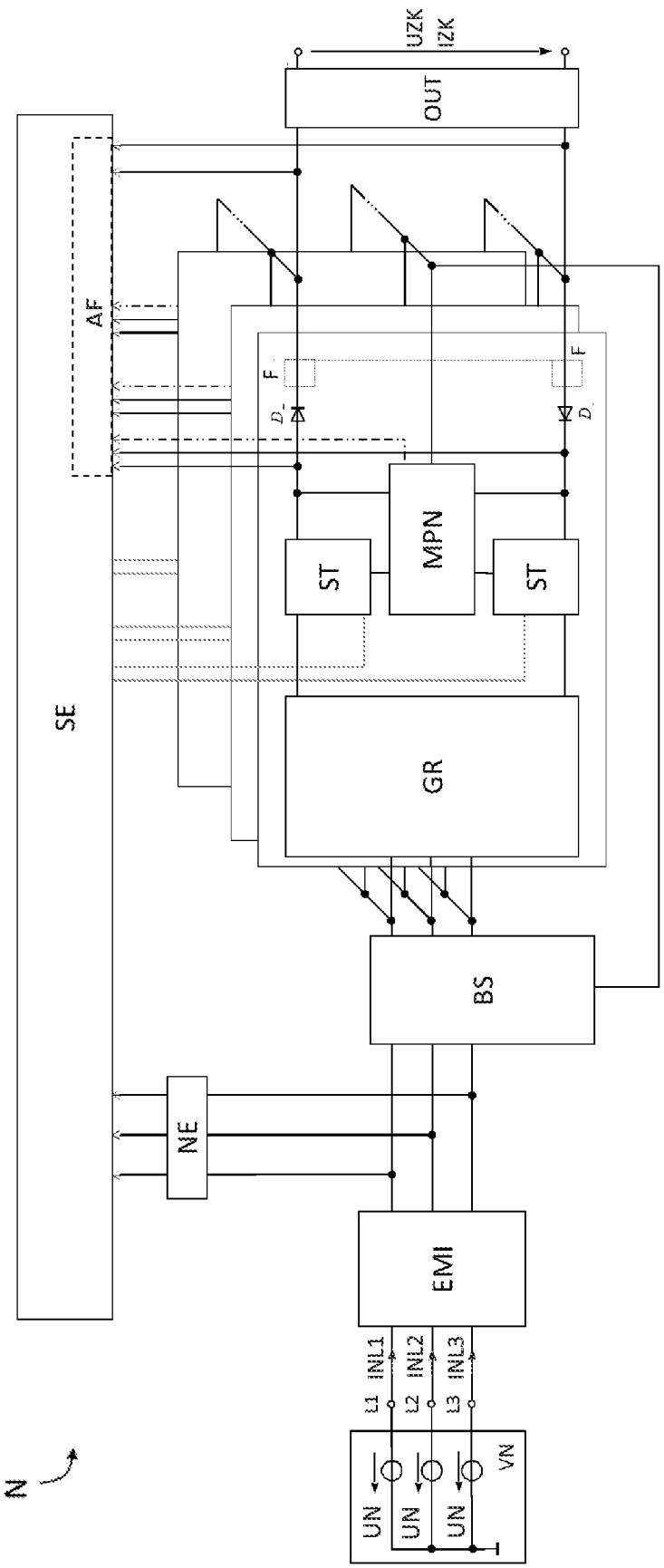
FIG. 12 a schematic diagram of a second embodiment of a network circuit.

FIG. 12 illustrates a second embodiment of the network circuit N as a multichannel system. In the multi-channel system, a certain number of channels are connected in parallel, which are then recombined on the output side. This system can be clocked either synchronously or according to the interleave principle, in which the channels clock in a staggered manner. For example, in a bi-channel system with interleave principle, two channels typically clock offset by half the period duration. In an n-channel system, for example, n channels clock offset by an n-divided period. In the multichannel system with interleave principle, the star point of the coupling circuit KS designed as a capacitor-star circuit serves as a common reference point of the midpoint network MPN. In a four-wire three-phase system, the neutral point NN of the neutral wire can alternatively serve as the common reference point of the midpoint network.

To ensure the operation of the network circuit shown in FIG. 12, two interconnected filters F and two diodes D+, D− are further illustrated. Optionally, output detection AE can be provided to detect voltage magnitudes and current magnitudes at different positions of each channel.

Figure 13:
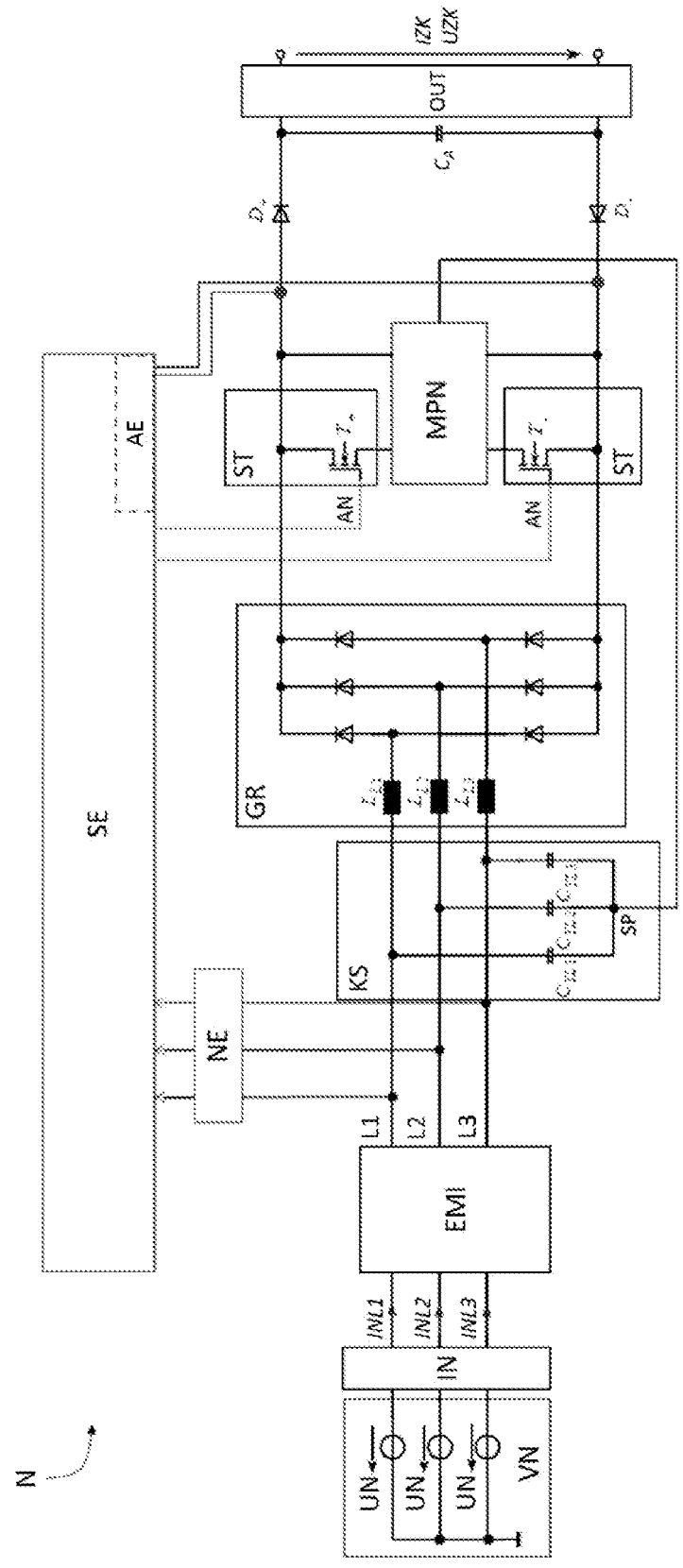
FIG. 13 the network circuit according to a first embodiment.

FIG. 13 illustrates the network circuit N according to FIG. 1 with selected examples of the components described above. The input IN of the network circuit N connects the three-phase supply network VN via phases L1, L2, L3 to the EMI filter. The network detection NE detects the network parameters NG of the phases L1, L2, L3 and passes them to the control unit SE. The control unit SE also includes the output detection AE, which detects the intermediate circuit voltage UZK and the intermediate circuit current IZK at the output OUT. The coupling circuit KS is a capacitor star circuit as described with reference to FIG. 7. The rectifier GR is the rectifier GR as described with reference to FIG. 2. The at least one control element ST is a control element ST as described with reference to FIG. 3. A first diode D+ and a second diode D− are arranged at the output OUT of the network circuit N so that an intermediate circuit voltage UZK at the output OUT remains independent of the clocking of the at least one control element ST. For clock independence, either only the first diode D+, the second diode D− or both diodes D+, D− can be provided. Furthermore, an output capacitor CA is provided between the output leads of the network circuit N. An intermediate circuit voltage UZK and a load-dependent intermediate circuit current IZK are provided at the output OUT.

The output capacitor CA is implemented with a capacitor in FIG. 13. In a second example, the output capacitor CA may be realized as a series connection of two or more capacitors, where the midpoint of the series connection may be routed to the midpoint network MPN, taking suitable measures (e.g., filters) into account.

Figure 14:
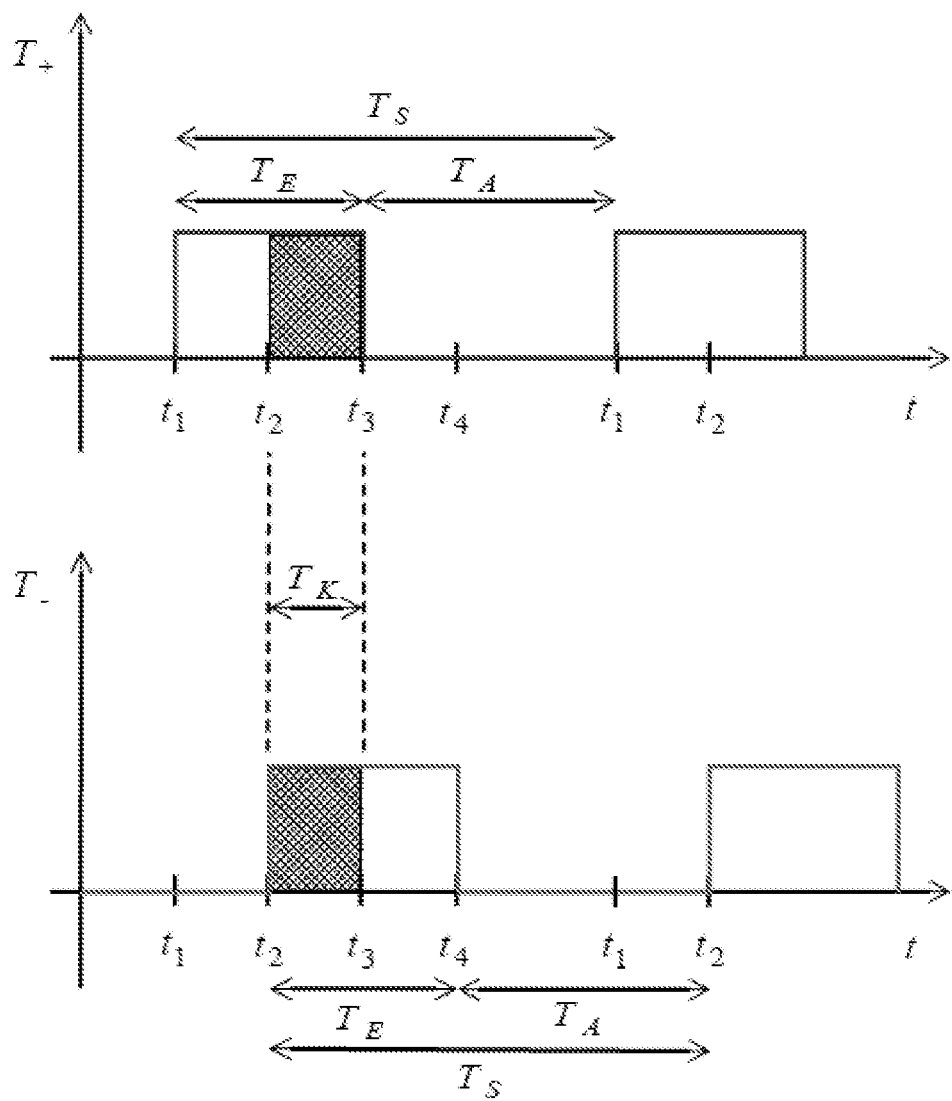
FIG. 14 a positive drive of at least one control element.
Figure 15:
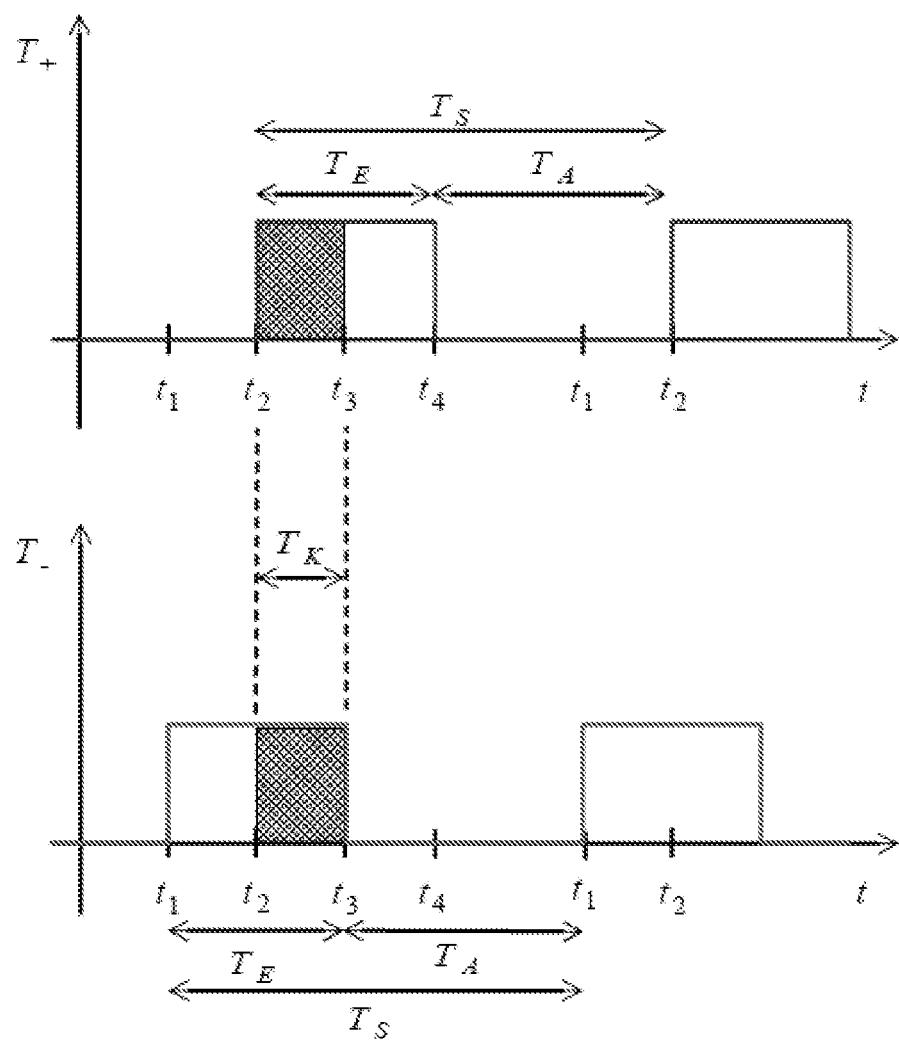
FIG. 15 a negative drive of the at least one control element.

FIGS. 14 and 15 show the control of the at least one control element ST. FIG. 14 illustrates a positive control of the at least one control element ST. In the network circuit N according to FIG. 1, the control unit SE drives the control inputs AN of the first and second switching transistors T+, T− in such a way that, in the case of positive drive, firstly the first switching transistor T+ is/becomes low-impedance at a time t1 up to a time t3 for a switch-on duration TE+, and then the second switching transistor T− is/becomes low-impedance at a time t3 for a switch-on duration TE+, the second switching transistor T− is/becomes low-resistance at a time t2 up to a time t4 for a switch-on duration TE− and during the time t2 up to the time t3 for a short-circuit duration TK the first and the second switching transistor T+, T− are/become low-impedance.

FIG. 15 illustrates a negative drive of the at least one control element ST. In the network circuit N according to FIG. 1, the control unit SE drives the control inputs AN of the first and second switching transistors T+, T− in such a way that, in the case of the negative drive, first the second switching transistor T− is/becomes low-impedance at a time t1 to a time t3 for a switch-on duration TE−, the first switching transistor T+ is/becomes low-impedance at a time t2 up to a time t4 for a switch-on duration TE+, and during the time t2 up to the time t3 for a short-circuit duration TK the first and the second switching transistor T+, T− are/become low-impedance.

In order for the network circuit N to function as desired and sinusoidal phase currents INL1, INL2, INL3 to be withdrawn from the supply network VN, not either only the positive or only the negative drive is executed, but both alternate periodically during operation. This depends on the network parameters NG of the phases L1, L2, L3 prevailing at the current time, which are detected by the network detection NE and evaluated by the control unit SE.

The network detection NE can comprise different possibilities for detecting the network parameters NG. Exemplarily, the network parameters NG may be detected by the network detection NE using one or more sensors. However, by way of example, the network parameters NG may also be detected by the network detection NE by means of a predetermined detection method based on an ACTUAL/TARGET adjustment.

The control unit SE comprises a microprocessor or microcontroller or functionally similar components for evaluating the network parameters NG detected by the network detection NE.

Figure 16:
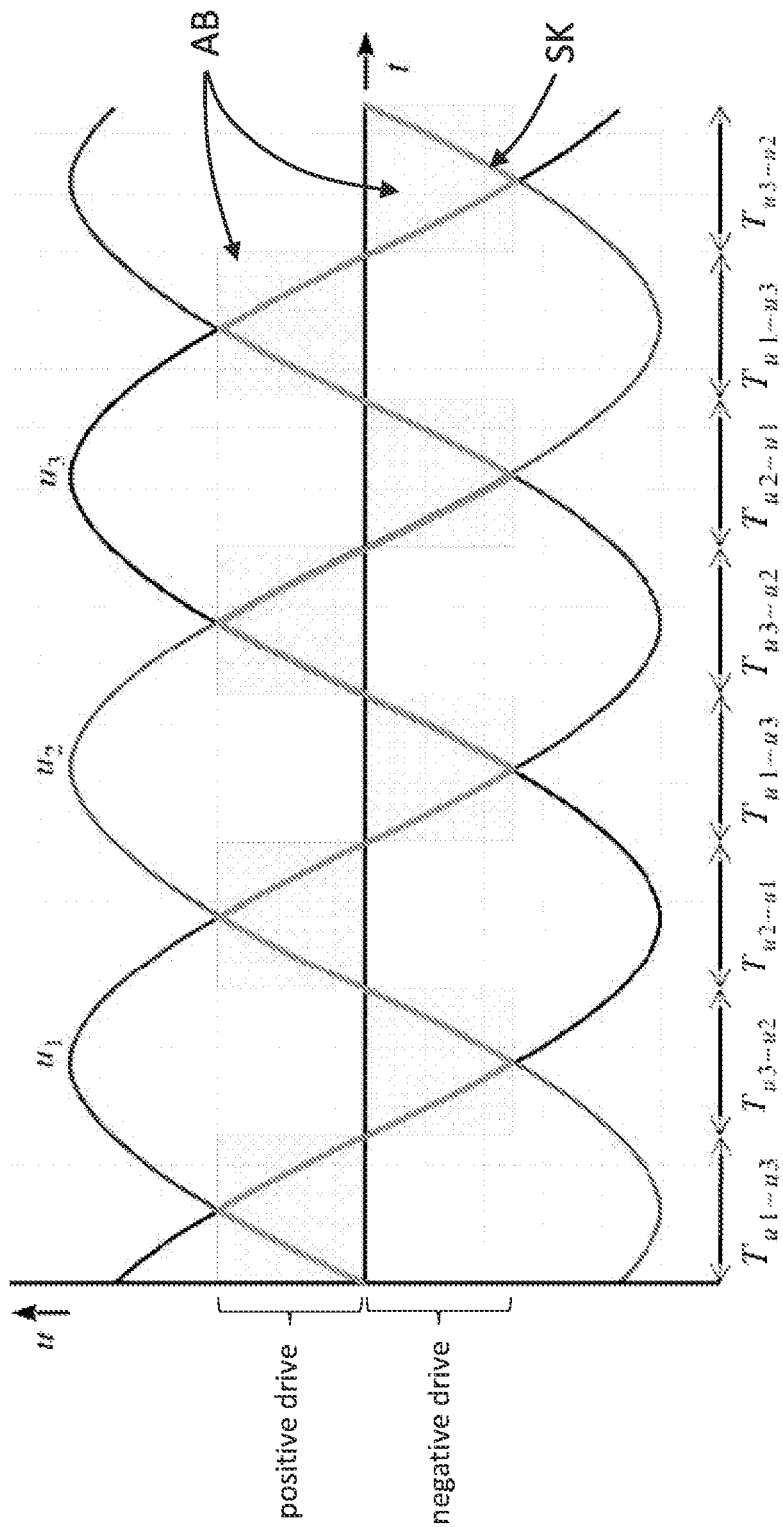
FIG. 16 a switching criterion of the supply network as a three-phase system.

FIG. 16 illustrates a switching criterion of the supply network VN as a three-phase system. Considering the phase voltages u1, u2, u3 of the three-phase system, there are time periods where two voltages are greater than zero and one voltage is less than zero and time periods where one voltage is greater than zero and two voltages are less than zero.

If two of the voltages are greater than zero, the positive control (see FIG. 14) is used in this time period or control block AB, and if two of the voltages are less than zero, the negative control (see FIG. 15) is used in this time period or control block AB. This switching criterion results in an approximately triangular voltage curve of sine sections SK, which always follows around the zero line.

For the voltage duration TU, which is the time for which a control is active in each case, the string voltages u1, u2, u3 are always in the same state, which means greater than zero or less than zero. Consequently, for a voltage duration TU can be defined $TU=T(u1-u3)=T(u3-u2)=T(u2-u1)$ due to the symmetric three-phase system.

At each zero point of the approximately triangular voltage curve of sine sections SK, there is a change from positive to negative drive or from negative to positive drive. If the approximate triangular voltage curve of sine sections SK runs from the negative control block AB, that is with a value less than zero, into a positive control block AB, that is with a value greater than zero, the drive changes from a negative drive to a positive drive. The transition from one control block AB to a next control block AB can be performed abruptly as shown. The transition from one control block AB to a next control block AB may further be smooth (not illustrated).

In the European supply network with a network frequency of fN=50 Hz, a zero occurs every 3.33 milliseconds in the three-phase system. Thus, every 3.33 milliseconds there is a change between positive and negative drive. However, the network circuit N is not limited to the European supply network. In fact, the network circuit N can be put into operation for all international network voltages and network frequencies.

Figure 17:
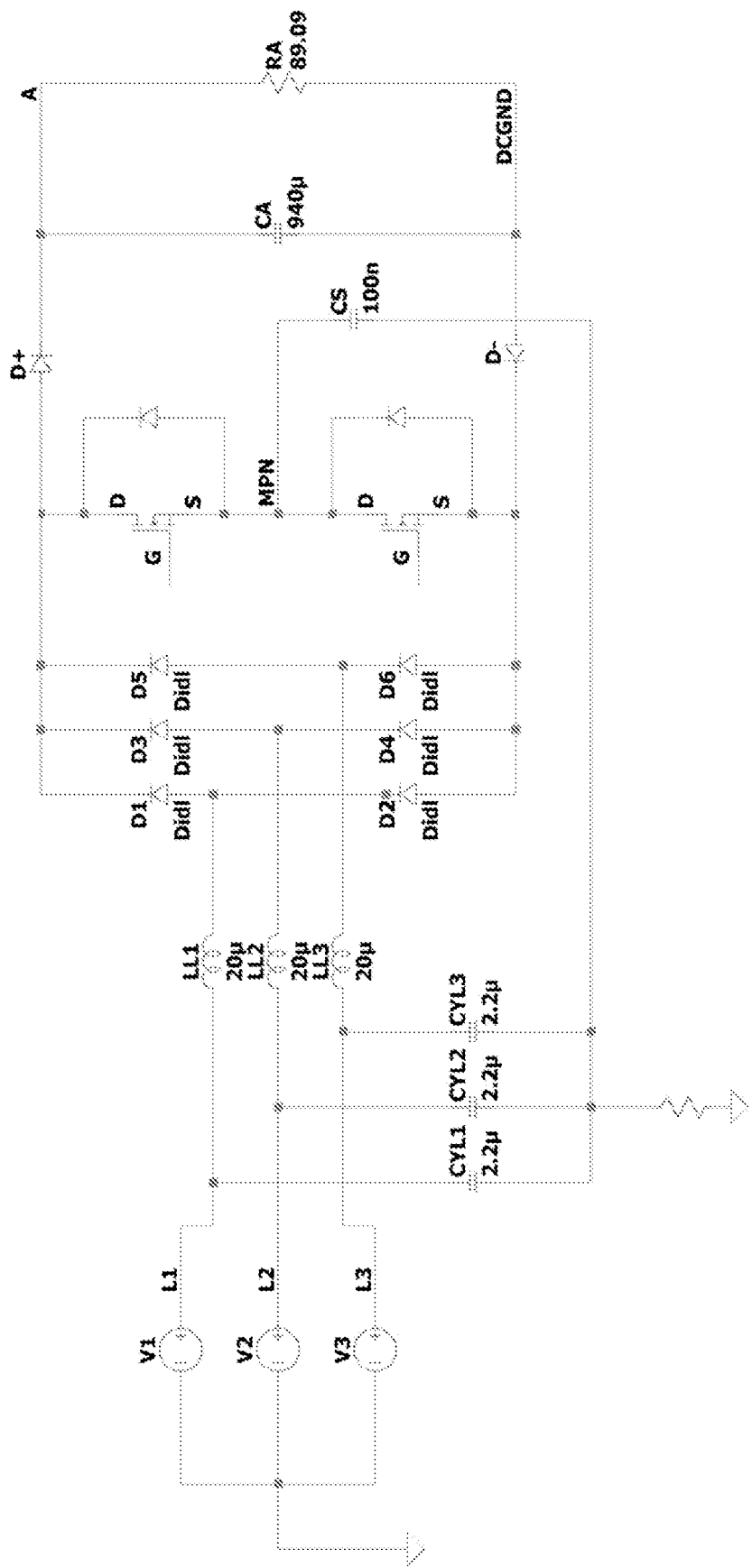
FIG. 17 a network circuit according to FIG. 9 with exemplary selected sizes of components and parts.

FIG. 17 illustrates the network circuit N according to FIG. 13 with exemplary selected sizes of components and parts as simulated in a simulation program for simulation purposes. The midpoint network MPN corresponds to the first example as described with reference to FIG. 4. For the sake of clarity, the network detection NE, the control unit SE and the EMI filter EMI have not been illustrated in this figure. The selection of the indicated sizes of the individual components serves to illustrate a first experimental setup. Thereby the selection of the sizes illustrates one of many choices without the intention to limit the sizes of the components.

FIG. 18A shows a first simulation result of the network circuit N according to FIG. 17. An output voltage V (A, DCGND) is illustrated, which has a constant value of 700V and corresponds to the intermediate circuit direct voltage UZK.

FIG. 18B shows a second simulation result of the network circuit N according to FIG. 17. Illustrated is the course of largely sinusoidal phase currents I(L1), I(L2), I(L3) in the phases L1, L2, L3, which correspond to the phase currents INL1, INL2, INL3.

FIG. 18C shows a third simulation result of the network circuit N according to FIG. 17. Illustrated is the course of network voltages V(L1), V(L2), V(L3) in the phases L1, L2, L3 which correspond to the phase voltages u1, u2, u3.

The invention claimed is:

1. A network circuit for providing an intermediate circuit direct voltage and a load-dependent intermediate circuit current at an output from a three-phase supply network, the network circuit ensuring that phase currents are substantially sinusoidal, the network circuit comprising:
    an input connected to the three-phase supply network via phases;
    an output connected to an intermediate circuit;
    a rectifier arranged between the input and the output;
    a network detection for detecting network parameters of the phases at the input and for detecting output parameters at the output;
    a control unit for driving a first switching transistor and a second switching transistor;
    a midpoint network connected to the output and to the phases of the input via the first switching transistor and the second switching transistor, the first switching transistor being connected to the control unit via a control input and the second switching transistor being connected to the control unit via a control input; and
    inductors arranged between a coupling circuit and the rectifier at the input of the rectifier,
    characterized in that
    the midpoint network comprises a capacitor pre-chargeable via a clocked signal of the first switching transistor and the second switching transistor and thus serving as an adjustable voltage source for adjusting a voltage difference via the inductor(s), wherein the capacitor provides enhanced voltage control across the inductors by adaptively adjusting short-circuit durations during simultaneous low-impedance states of both switching transistors.

2. The network circuit according to claim 1, wherein the coupling circuit connected between the phases at the input and the midpoint network is adapted to extract sinusoidal phase currents from all phases.

3. The network circuit according to claim 1, wherein the capacitor serves to generate a controllable voltage drop via the inductor(s).

4. A network circuit for providing an intermediate circuit direct voltage and a load-dependent intermediate circuit current at an output from a four-wire three-phase system with neutral wire, the network circuit ensuring that phase currents are substantially sinusoidal, the network circuit comprising:
    an input connected to the three-phase supply network via phases;
    an output connected to an intermediate circuit;
    a rectifier arranged between the input and the output;
    a network detection for detecting network parameters of the phases at the input and for detecting output parameters at the output;
    a control unit for driving a first switching transistor and a second switching transistor;

a midpoint network connected to the output and to the phases of the input via the first switching transistor and the second switching transistor, the first switching transistor being connected to the control unit via a control input and the second switching transistor being connected to the control unit via a control input; and inductors arranged between a coupling circuit and the rectifier at the input of the rectifier, characterized in that the midpoint network comprises a capacitor pre-chargeable via a clocked signal of the first switching transistor and the second switching transistor and thus serving as an adjustable voltage source for setting a voltage difference via the inductor(s), wherein the capacitor provides enhanced voltage control across the inductors by adaptively adjusting short-circuit durations during simultaneous low-impedance states of both switching transistors.

5. The network circuit according to claim 4, wherein the capacitor serves to generate a controllable voltage drop via the inductor(s).

6. The network circuit according to claim 1, wherein the capacitor of the midpoint network is arranged in series between the phases at the input and the connection point of the first switching transistor and the second switching transistor.

7. The network circuit according to claim 1, wherein the midpoint network further comprises an inductor connected in series between the phases at the input and the first switching transistor and the second switching transistor.

8. The network circuit according to claim 1, wherein the midpoint network comprises a capacitor with a first inductor with diode and a second inductor with diode, wherein the capacitor is connected in series between the phases at the input and the first switching transistor and the second switching transistor.

9. A method for modulating a current from a three-phase supply network to provide an intermediate circuit direct voltage and a load-dependent intermediate circuit current at an output with sinusoidal phase currents, the method comprising:

feeding a network circuit with phase currents from a three-phase supply network via phases;

detecting network parameters of the phases by a network detection;

rectifying the phase currents in the phases to generate a rectified current, wherein the rectified current is distributed into a first rectified current and a second rectified current depending on a clock state;

supplying at least one output with the first rectified current;

Passing the second rectified current through a first switching transistor and a second switching transistor;

driving control inputs of the first switching transistor and the second switching transistor by the control unit to forward a part of the second rectified current as a clocked signal to the phases via a midpoint network;

pre-charging a capacitor of the midpoint network with the clocked signal;

modulating the phase currents in the phases via the inductor(s) with the clocked signal;

providing the intermediate circuit direct voltage and the load-dependent intermediate circuit current at the output; and withdrawing sinusoidal currents from the supply network, wherein the capacitor adjusts the modulation based on the driving.

10. The method according to claim 9, wherein the modulating comprises a controllable voltage drop via the inductor(s) through the pre-charged capacitor.

11. The method according to claim 9, wherein the modulation of the phase currents in the phases with the forwarded clocked signal is carried out via a coupling circuit.

12. The method according to one of the claim 9, wherein the detecting network parameters comprises detecting at least one of a phasing, string voltages and phase currents.

13. The method according to one of the claim 9, wherein the driving the control inputs of the first switching transistor and of the second switching transistor regulates/influences a level of the forwarded clocked signal and the intermediate circuit voltage via a duty factor.

14. The method according to claim 9, in which the driving of the control inputs of the first and second switching transistors by the control unit is performed in such a way that, in the case of positive driving, firstly the first switching transistor is/becomes low-impedance at a time t1 up to a time t3 for a switch-on duration, the second switching transistor is/becomes low-impedance at a time t2 up to a time t4 for a switch-on duration, and during the time t2 up to the time t3 for a short-circuit duration the first and the second switching transistor are/become low-impedance.

15. The method according to claim 9, wherein the driving of the control inputs of the first and second switching transistors by the control unit is performed in such a way that, in the case of negative driving, firstly the second switching transistor is/becomes low-impedance for a switch-on duration at a time t1 up to a time t3, the first switching transistor is/becomes low-impedance at a time t2 up to a time t4 for a switch-on duration, and during the time t2 up to the time t3 for a short-circuit duration the first and the second switching transistor are/become low-impedance.

16. The method according to any one of claim 9, wherein the modulation of the forwarded clocked signal is performed in such a way that the sinusoidal phase currents at the input comply with limit values for harmonic currents according to a power-factor correction (PFC) standard during operation.

17. The method according to one of the claim 9, wherein the driving of the control inputs of the first and second switching transistors is clocked at a clock frequency higher than a network frequency.

* * * * *